US012594957B2

(12) United States Patent
Augst

(10) Patent No.: US 12,594,957 B2
(45) Date of Patent: Apr. 7, 2026

(54) VEHICLE SYSTEM AND METHOD FOR OPERATING A FUNCTIONALITY, DESIGNED FOR AT LEAST PARTIALLY AUTOMATED DRIVING OR PARKING, IN A VEHICLE

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 165 days.

(21) Appl. No.: 18/558,832

(22) PCT Filed: May 2, 2022

(86) PCT No.: PCT/EP2022/061651
§ 371 (c)(1),
(2) Date: Nov. 3, 2023

(87) PCT Pub. No.: WO2022/233759
PCT Pub. Date: Nov. 10, 2022

(65) Prior Publication Data
US 2024/0239372 A1      Jul. 18, 2024

(30) Foreign Application Priority Data
May 5, 2021    (DE) ..................... 10 2021 111 642.2

(51) Int. Cl.
B60W 60/00        (2020.01)
B60W 30/06        (2006.01)
B60W 50/14        (2020.01)

(52) U.S. Cl.
CPC .......... B60W 60/001 (2020.02); B60W 30/06 (2013.01); B60W 50/14 (2013.01); (Continued)

(58) Field of Classification Search
CPC .... B60W 60/001; B60W 30/06; B60W 50/14; B60W 2540/225; B60W 2540/229; (Continued)

(56) References Cited

U.S. PATENT DOCUMENTS 10,442,443 B1 * 10/2019 Li ......................... B60W 50/10
2017/0282912 A1 * 10/2017 Chan ................... A61B 5/02055
(Continued)

FOREIGN PATENT DOCUMENTS

DE     10 2014 013 960 A1     3/2016
DE     10 2015 207 486 A1     10/2016
(Continued)

OTHER PUBLICATIONS

Schlegel Matthias et al. Dec. 6, 2016 English Machine Translation_ DE-102016224291-A1 provided by Patent Translate by EPO and Google (Year: 2016).*

(Continued)

*Primary Examiner* — Ashley L Redhead, Jr.
(74) *Attorney, Agent, or Firm* — Crowell & Moring LLP

(57) ABSTRACT

A vehicle system has a first operating mode and a second operating mode. The first operating mode is configured to execute a functionality of the vehicle system in driving mode based on acquired sensor signals and to operate the vehicle in an at least partially automated manner through interventions in vehicle guidance based on the result of the executed functionality. The second operating mode is configured to change a degree of the effectiveness of the interventions in the driving mode and/or a degree of the effectiveness of an operation decoupled from the vehicle guidance, and, when executing a functionality of the vehicle system with a changed degree of the effectiveness of an intervention in the vehicle guidance and/or a changed degree of the effectiveness of an operation decoupled from the (Continued)

vehicle guidance, to acquire operating data of the vehicle and/or feedback data from the user of the vehicle.

20 Claims, 1 Drawing Sheet

(52) U.S. Cl.
CPC . *B60W 2540/225* (2020.02); *B60W 2540/229* (2020.02); *B60W 2555/00* (2020.02); *B60W 2556/45* (2020.02)

(58) Field of Classification Search
CPC ......... B60W 2555/00; B60W 2556/45; B60W 2050/146; B60W 2520/10; B60W 2556/05; B60W 2556/50; B60W 50/0098; B60W 2050/0018
See application file for complete search history.

(56) References Cited

U.S. PATENT DOCUMENTS

| | | | |
|---|---|---|---|
| 2018/0365740 A1* | 12/2018 | Nix | B60W 50/08 |
| 2019/0072961 A1 | 3/2019 | Xavier | |

| | | | |
|---|---|---|---|
| 2019/0232955 A1* | 8/2019 | Grimm | G06V 10/803 |
| 2019/0337521 A1 | 11/2019 | Stauber | |

FOREIGN PATENT DOCUMENTS

| | | | |
|---|---|---|---|
| DE | 10 2016 220 870 A1 | 4/2018 | |
| DE | 102016224291 A1 * | 6/2018 | B60W 40/08 |
| DE | 10 2017 216 321 A1 | 3/2019 | |
| DE | 10 2018 132 928 A1 | 6/2020 | |
| EP | 3 566 923 A1 | 11/2019 | |

OTHER PUBLICATIONS

International Search Report (PCT/ISA/210) issued in PCT Application No. PCT/EP2022/061651 dated Aug. 25, 2022 with English translation (6 pages).
German-language Written Opinion (PCT/ISA/237) issued in PCT Application No. PCT/EP2022/061651 dated Aug. 25, 2022 with English translation (10 pages).
German-language Search Report issued in German Application No. 10 2021 111 642.2 dated Feb. 3, 2022 with partial English translation (12 pages).

* cited by examiner

VEHICLE SYSTEM AND METHOD FOR OPERATING A FUNCTIONALITY, DESIGNED FOR AT LEAST PARTIALLY AUTOMATED DRIVING OR PARKING, IN A VEHICLE

BACKGROUND AND SUMMARY

The invention relates to a vehicle system and a method for operating a functionality, designed for at least partially automated driving or parking, in a vehicle. The invention furthermore relates to a vehicle system and methods for use in a vehicle for at least partially automated driving or parking.

Vehicle systems of this type are already known from the prior art, in which the vehicle is operated in an at least partially automated manner in driving operation based on acquired sensor signals by interventions in the vehicle guidance. Known systems are, for example, automated longitudinal and/or lateral guidance systems.

The object of the invention is to provide a vehicle system for operating a functionality, designed for at least partially automated driving or parking, in a vehicle, which is designed to acquire data about the performance of a system for at least partially automated driving or parking and/or information on the effectiveness of the (for example, controlling or regulating) interventions of the device, and information relating to feedback of the user of the vehicle. Furthermore, the object of the invention can include reducing possible disadvantages or risks which could be connected to an introduction of new functionalities.

The object is achieved by the features of the claimed invention. It is to be noted that additional features of a claim dependent on the independent claim, without the features of the independent claim or only in combination with a subset of the features of the independent claim, can form a separate invention independent of the combination of all features of the independent claim, which can be made the subject matter of an independent claim, a divisional application, or a subsequent application. This applies in the same manner to the technical teachings described in the description, which can form an invention independent of the features of the independent claims.

The invention proceeds, inter alia, from the following considerations: For an optimum design of a system for automated driving, the presence of as much data as possible is advantageous. Instead of waiting for a specific (rare) driving situation which is suitable for the development, securing, and/or training of a vehicle system, a device of the vehicle, for example, a part of a system for at least partially automated driving or parking, is provided with a specific second operating mode and operated. Furthermore, the invention is based on the consideration of designing such a second operating mode, using which diverse data about the mode of operation of the vehicle system or the functionality can be ascertained, without at the same time causing the disadvantages of a potentially flawed or unexpected action or a corresponding intervention (for example, in the scope of automated driving or parking).

According to embodiments of the invention, a vehicle system is proposed for use in a vehicle for at least partially automated driving or parking, which is operable in a first and second operating mode, wherein the first operating mode is configured to execute a functionality of the vehicle system in driving operation based on acquired sensor signals and, based on the result of the executed functionality, to operate the vehicle in an at least partially automated manner by interventions in the vehicle guidance. The second operating mode (in contrast) is configured to change a degree of the effectiveness of the interventions in the driving operation and/or a degree of the effectiveness of an operation decoupled from the vehicle guidance, to execute a functionality of the vehicle system with changed degree of the effectiveness of an intervention in the vehicle guidance and/or changed degree of the effectiveness of an operation decoupled from the vehicle guidance, and, upon execution of a functionality of the vehicle system with changed degree of the effectiveness of an intervention in the vehicle guidance and/or changed degree of the effectiveness of an operation decoupled from the vehicle guidance, to acquire operating data of the vehicle and/or feedback data of the user of the vehicle and provide these data for further use (inside or outside the vehicle).

Analogously to the system according to embodiments of the invention, the invention is also directed to a method for operating a vehicle system designed for use in a vehicle for at least partially automated driving. The method can comprise operating the vehicle system in a first operating mode and in a second operating mode, and in particular switching the vehicle system from a first operating mode to the second operating mode and/or from the second operating mode to the first operating mode. In this case, in a first operating mode the vehicle is operated in an at least partially automated manner in driving operation based on acquired sensor signals by interventions in the vehicle guidance. In a second operating mode, a degree of the effectiveness of the interventions in the driving operation and/or a degree of the effectiveness of an operation decoupled from the vehicle guidance is changed, the vehicle system is operated with changed degree of the effectiveness of the interventions in the driving operation and/or with changed degree of the effectiveness of an operation decoupled from the vehicle guidance, and, based on the operation of the vehicle system in the second operating mode, operating data of the vehicle and/or feedback data of the user of the vehicle are acquired and provided for further use. The degree of the effectiveness of the interventions in the driving operation and/or the degree of the effectiveness of an operation decoupled from the vehicle guidance can be varied in the method, in particular in driving operation or in parking operation (for example, depending on a predetermined condition). The method is understood in particular as the operating method of the vehicle system.

A further aspect of the invention relates to a computer program product which is designed to carry out a method according to embodiments of the invention. Refinements described hereinafter apply both to the system according to embodiments of the invention and to the method according to embodiments of the invention and a correspondingly designed computer program product.

The vehicle can advantageously be designed as a motor vehicle (for example, passenger vehicle, truck, bus) or a two-wheeled vehicle (for example, motorcycle, bicycle, scooter). Alternatively, the vehicle can be an agricultural vehicle, a construction vehicle, or a machine for executing earth movements.

The vehicle system can be designed to execute the at least partially automated driving or parking functionality or can comprise a device or a module for executing the functionality. The functionality can correspondingly also be understood as a module for executing the functionality. In particular, the device, the module, or the functionality can be a development stage of the device, the module, or the functionality. In this case, this can be a functionality which does not yet correspond to a long-term goal but is at least partially useful in driving operation or a development stage (hardware or software version) of the functionality or the corresponding module.

The term vehicle guidance can relate to longitudinal guidance, lateral guidance, and/or maneuver execution. An intervention can comprise or be, for example, a specification, actuation, or regulation of a chassis parameter (for example, acceleration, braking, and/or steering of a vertical-dynamic parameter of the chassis). Accordingly, the term "vehicle guidance" or "intervention" can relate to parking or to interventions during at least partially automated parking (also to be understood as: parking, unparking, and/or maneuvering) or to a parameter during parking.

Furthermore, the vehicle can comprise devices to change a degree of the effectiveness of an intervention in the vehicle guidance and/or a degree of the effectiveness of an operation decoupled from the vehicle guidance. The degree of the effectiveness and/or a degree of the effectiveness of an operation decoupled from the vehicle guidance or the decoupling relates in particular to influences which come from the vehicle system. Such influences can be in particular actions, interventions, and/or an actuation of an actuator. This relates here in particular to the effectiveness of what is effectuated from the vehicle system and/or is executed or would be executed by way of an actuator. The change can be carried out at least partially mechanically and/or electronically. In particular, the vehicle system can comprise devices to change the degree of the effectiveness of an intervention in the vehicle guidance and/or a degree of the effectiveness of an operation decoupled from the vehicle guidance in running driving operation (also parking operation) of the vehicle dynamically and/or depending on a predetermined condition.

Furthermore, the vehicle system can comprise devices to acquire operating data of the vehicle and/or feedback data of the user of the vehicle and making these data available for further use. This can be carried out, for example, by way of a memory or memory system (associated with the vehicle system). The use of the data is understood in particular as a use outside the vehicle.

The operating data of the vehicle and/or the feedback information of the user of the vehicle are preferably (also) characteristic for a (for example later) operation of the vehicle system in the first operating mode (or in a subsequently deactivated or acquired second operating mode).

In particular, such operating data of the vehicle and/or such feedback information are ascertained which (already) explicitly or implicitly comprise information about the operation of the functionality in the first operating mode (or in a subsequently deactivated or acquired second operating mode). In particular, operating data and/or feedback information are ascertained which enable an inference about the operation of the functionality in the first operating mode (or in a subsequently deactivated or acquired second operating mode), in particular with respect to performance, risks, advantages, disadvantages, etc.

Alternatively or additionally, information with respect to the (possible) operation of the vehicle system in the first operating mode (or in a subsequently deactivated or acquired second operating mode) can be ascertainable or ascertained from the operating data of the vehicle and/or from the feedback information, in particular by processing (for example, a specific method, process, conversion formula, data analysis, evaluation logic, etc.). For example, a degree of performance, risks, advantages, and/or disadvantages of an operation (executed later or in another vehicle)

of the vehicle function in the at least one first operating mode can be ascertained upon use of the data.

The operating data of the vehicle and/or the feedback data of the user of the vehicle can be ascertained, made available, and/or used as (for example, short, selectable) data portions. The data portions can preferably characterize, in particular represent, a chronologically and/or spatially extended procedure here (so to speak a "recording" selectable according to a specific condition). The operating data of the vehicle and/or feedback data of the user of the vehicle can characterize a change or a progression of the respective values—for example within a time interval and/or in relation to a specific situation, a driving situation, a maneuver, and/or a roadway section here.

In the at least one second operating mode, the operating data of the vehicle and the feedback data of the user of the vehicle, which at least partially relate to the same situation, driving situation, the same maneuver, the same roadway section, and/or the same time interval, are preferably ascertained, made available and/or used. For example, the respective parameters or data portions of the operating data of the vehicle and the feedback data of the user of the vehicle can be assigned to one another (for example, according to a chronological criterion, coordinate, causality) and/or made available together or used together and/or as data assigned to one another.

The second operating mode is distinguished in particular in that in a driving operation of the vehicle, in particular a customer vehicle in the field, it ascertains or computes data for critical situations, but uses these data in a noncritical ("harmless") manner and/or makes them available for further use (for example transmits them to a backend). In this meaning, the vehicle system and the method for ascertaining the data can be configured in conjunction with a functionality, designed for at least partially automated driving or parking, in a vehicle.

In a simplified case, it can be a "decoupled" mode, in which the control of the systems of the vehicle predominantly takes place virtually and/or a corresponding visualization or augmentation is executed instead of specific actions. The functionality provided in any case or the device (for example as a part of the vehicle system) can therefore nevertheless reasonably also be used for the user of the vehicle by embodiments of the invention in situations in which it is not active or it is only active for a specific functionality, in that, for example, a degree of the effectiveness of the functionality (for example, the user effectiveness and/or the customer effectiveness of a performance feature of the at least partially automated driving or parking functionality) in driving operation and/or a degree of the effectiveness of an operation decoupled from the control of the vehicle is varied.

Alternatively or additionally, at least two functionalities, in particular at least two customer functionalities of the device can be implemented and/or operated according to embodiments of the invention by way of—at least in part—the same units (hardware, algorithms, software components).

The term "functionality" can also be understood in the scope of the present document as a performance feature (or a feature) of a (for example larger) (user) function or an equipment variant of the vehicle. In particular an (initially at least potentially) useful and/or (initially at least potentially) executable functionality is to be understood as a functionality. The vehicle system can be designed to execute multiple functionalities (for example user functionalities), in particular overlapping sets of the functionalities, and/or can comprise one or more components (for example configured for executing functionalities).

The vehicle system according to embodiments of the invention can be operated, on the one hand, in terms of an at least partially active user function (for example, a customer function in one or more customer vehicles) and, on the other hand, in terms of a shadow function for ascertaining the operating data and/or feedback data using the vehicle system in the second operating mode. A selectable (preferably variably or dynamically in driving operation) component of the functionality or functionalities can so to speak at least partially be "activated" in a user-effective manner and at least partially can be executable so to speak as a "shadow functionality", wherein valuable data are ascertainable. The proportion of the executions of customer-effective executions of the functionality and the proportion of executions which are predominantly or only used to ascertain the data can be varied here.

Switching over from the first to the second operating mode or from the second to the first operating mode can preferably take place as a function of one of the following parameters and/or the following conditions:

a setting or an operating action of the user of the vehicle (for example, of a desired degree of automation, a selection of performance features, etc.), and/or a parameter of the current or predicted usage type of the vehicle, and/or a parameter of the current or predicted driving context, and/or a parameter or pattern of the driving situations and/or roadway arrangements.

In a further combinable example, the vehicle system can comprise one or more partially active (customer-effective) functionalities (for example, a first selection of performance features) and one or more functionalities (for example, a second selection of performance features) decoupled from the effectiveness (not customer-effective, for example, cannot physically intervene in driving events). For example, the first selection and/or the second selection of the performance features can be varied in driving operation (for example, depending on the aforementioned predetermined condition). In a further example, the one or more user-effective (at least predominantly at a point in time) and the one or more not user-effective (at least predominantly at a point in time) functionalities can differ due to the respective operating parameters and/or configuration, in particular due to parameter variants or configuration variants. The advantage results therefrom that these can be operated at least partially simultaneously or at least partially alternately and optionally can be used to generate data simultaneously or at least partially alternately.

In addition, the invention also comprises the option of also "using" the driver, in particular the final customer, as a feedback generator in a real situation, which can take place more or less consciously or more or less unconsciously for the final customer. Ideally, feedback information of the driver is ascertained for a recording of the data which was caused by an action which was not actually executed, but rather proposed by the vehicle system (at least partially virtually).

The feedback information—in particular together with the data portions which characterize the "proposal" of the vehicle system—can be stored, provided, and/or used later, for example, in a ring memory of the vehicle system. For example, this information is used for (further) development, securing, for training, and/or for operating a vehicle system.

Using the vehicle system, findings can (also) be obtained on the basis of the operating data of the vehicle and/or feedback data of the user of the vehicle, which relate to the operation of the vehicle system in the first operating mode (or in a subsequently deactivated or acquired second operating mode).

In one particularly advantageous embodiment, the invention comprises, for example, such an optimization of the vehicle system or the control data (which the vehicle system generates to execute at least one functionality) that, after one or more optimizations, feedback information corresponding to a target value results, which comprises, for example, an inference about the most positive possible feedback of the user of the vehicle.

Preferably, a combination of the operating data of the vehicle and the feedback data of the user of the vehicle which relate to the same situation, the same driving situation, the same maneuver, the same roadway section, and/or the same time interval and/or have a specific correlation and/or causality (also to be understood data based on a combination of the operating data of the vehicle and the feedback data of the user of the vehicle) is ascertained, made available, and/or used. Data characterizing a correlation of the operating data of the vehicle and the feedback data of the user of the vehicle and/or data which enable an inference about a causal relationship between the respective operating data of the vehicle and the feedback data of the user or to respective causative events, situations, contexts, etc. can be used here.

Preferably, the operating data of the vehicle and/or feedback data of the user of the vehicle are made available in that these are provided (with or without storage in a volatile or nonvolatile memory of the vehicle or memory carried along with the vehicle) to a computing unit arranged remotely from the vehicle (for example, a backend, cloud, computing center, development environment having a centralized or decentralized architecture). The making available, in particular the provision, can take place wirelessly. The making available can be initiated (for example, from the respective vehicle) depending on the ascertainment or presence of the operating data of the vehicle and/or feedback data of the user and/or depending on the aforementioned predetermined condition.

Alternatively or additionally, the making available can be initiated from the remotely arranged computing unit. For example, the at least one predetermined condition can be varied for one or more vehicles corresponding to specific criteria (preferably from the remotely arranged computing unit).

Preferably, processing, in particular aggregation of a large number of the data portions characterizing operating data of the vehicle and/or feedback data of the user takes place from a large number of vehicles, countries, variants of the functionality for at least partially automated driving and/or parking.

A further aspect of the invention therefore relates to a computing unit (for example, backend, cloud, computing center, development environment) arranged remotely (from one or more of the vehicles), which is configured to change the second operating mode of a large number of the vehicle systems and/or large number of the vehicles and/or to input the (respectively made available) operating data of the vehicle and/or feedback data of the user of the vehicle and aggregate them (for example, according to a specific rule).

The use of the operating data of the vehicle and/or feedback data of the user of the vehicle particularly preferably relates to aggregated data from a large number of the vehicles. Data can be ascertained here depending on or on the basis of the operating data of a large number of the vehicles and/or feedback data of a large number of the users of vehicles. The data can be used for (further) development, securing, and/or training of the aforementioned or a further functionality for at least partially automated driving or parking. For example, the data can be used for developing, training, and/or operating a functionality for at least partially automated driving or parking for further vehicles. Therefore, the scope of the invention (also) includes a functionality (of the same or a further) vehicle, which is trained and/or operated depending on the data.

A further aspect of the invention relates to—in particular processed and/or aggregated—data (for example, a part of a database, data memory), which were or are ascertained depending on (in particular on the basis of) operating data of the vehicle and/or feedback data of the user, and (further) functionalities that can be designed or operated depending on the data.

A further aspect of the invention relates to a neural network which is configured and/or trained depending on or on the basis of the—in particular processed and/or aggregated—operating data of a large number of the vehicles and/or feedback data of a large number of the users of vehicles.

The operating data of the vehicle and/or the feedback data of the user of the respective vehicle can advantageously be ascertained, made available, aggregated, and/or used from vehicles from a vehicle fleet. A vehicle fleet can comprise, for example, more than $10^4$, $10^5$, $10^6$, $10^7$ vehicles.

Due to such a large number of vehicles, a so-called transition from quantity to quality or a paradigm shift can take place with respect to the effect achievable according to embodiments of the invention. In particular, this is to be understood to mean that upon the use of a large number of vehicles, a technical effect which is strengthened and/or different in principle can result than upon the use of one or a few vehicles.

In one advantageous refinement, it can be provided that the degree of the effectiveness of the interventions and/or the degree of the effectiveness of an operation decoupled from the vehicle guidance is changeable in multiple steps, in particular at least partially even nearly continuously.

At least one or two of the multiple steps can be a step different from a completely or nearly completely coupled state and/or from a completely or nearly completely decoupled state here. The one or two of the multiple steps can have intermediate values with respect to the degree of the effectiveness of the interventions and/or the degree of the effectiveness of an operation decoupled from the vehicle guidance. The at least one or two of the multiple steps can include a limited and/or partial effectiveness of the interventions or a degree of the effectiveness having an intermediate value between no (or almost no) or full (or almost full) effectiveness. For example, in the one or in two of the multiple steps only specific, selected, or selectable interventions can be effective and/or a degree of the effectiveness of at least one intervention can be limited to a specific limiting value.

The degree of the effectiveness of the interventions and/or the degree of the effectiveness of an operation decoupled from the vehicle guidance or the at least one step can relate (at least predominantly, only, or essentially only) to specific performance features, in particular so-called features of one or more larger functionalities, or to a specific combination of the performance features (also: features).

The degree of the effectiveness of interventions and/or the degree of the effectiveness of an operation decoupled from the vehicle guidance, in particular the step, can be determined or adapted depending on at least one predetermined condition. This can be dynamically controlled (during the driving operation of the vehicle).

The at least one predetermined condition can be, for example, a mathematical relationship (for example, one or more rules, formulas, and/or coefficients of a specific formula, etc.), according to which the degree of the effectiveness of the interventions and/or the degree of the effectiveness of an operation decoupled from the vehicle guidance (for example as a respective expedient step) is determined or adapted.

In particular, it can be provided that the degree of the effectiveness of interventions and/or the degree of the effectiveness of an operation decoupled from the vehicle guidance is changeable in at least two steps, wherein the at least two steps are assigned to one of the following categories:

operating the vehicle system without a directly perceptible effect for the driver or with a hardly perceptible effect for the driver, operating the vehicle system with an output of driver information, in particular with an output of driver information without an intervention in the vehicle guidance, and/or operating the vehicle system with a visualization of an action which would result due to an intervention of the vehicle system in the vehicle guidance (for example, visualization of a specific maneuver which the vehicle system would execute without actually executing it).

At least one of the multiple steps for one or more of the categories, in particular within the one or more categories, can include respective intermediate values here between a completely or nearly completely coupled state and/or a completely or nearly completely decoupled state.

Particularly preferably, in the at least one second operating mode in one of the at least two steps, operating data of the vehicle and/or feedback data of the user of the vehicle can be ascertained in each case, which at least partially characterize operating data of the vehicle and/or feedback data of the user of the vehicle, which would apply upon the execution of at least one further category (for example, the next or closest category in accordance with the above-mentioned categories) or upon operation of the functionality in the first operating mode. In other words, the operating data of the vehicle and/or feedback data of the user of the vehicle ascertained in one category can be used to enable an inference about the operation of the functionality (the same or correspondingly similar functionality) in the same or in a further vehicle.

In this case, for example, a replacement of an intervention of the vehicle in the chassis can be executed depending on an operating parameter of the vehicle, for example, the velocity range, a parameter of the situation in the surroundings of the vehicle, a status, a degree of attentiveness and/or a viewing direction of the driver of the vehicle, and/or a degree of risk.

In a further advantageous embodiment of the invention, it can be provided that the operating data of the vehicle and/or the feedback data of the user of the vehicle are made available for at least one of the following uses:

to test and/or to secure a development state of the vehicle system, to ascertain at least one performance indicator of the vehicle system, for example, to ascertain a KPI of the vehicle system, to prove a positive risk balance of the vehicle system, in
   particular for inferences about an expected perfor-
   mance of the vehicle system on real environmental
   objects of the vehicle,
to operate a vehicle system for at least partially automated
   driving of a further vehicle,
to determine one or more—in particular dependent on
   further information—limiting parameters for operating
   the vehicle system,
to train a neural network, in particular a DNN (=deep
   neural network),
to activate and/or block functionalities or limiting param-
   eters (for example performance limiting parameters) of
   functionalities of a vehicle, in particular of vehicles
   having vehicle systems for at least partially automated
   driving,
to activate and/or block defined feedback functionalities
   of the vehicle system, in particular for similar starting
   situations, and/or
to change data of a digital map and/or data for interpre-
   tation of a digital map, in particular to activate and/or
   to block specific roadway sections for the execution of
   specific performance functionalities and/or feedback
   functionalities in specific situations.

The securing, the performance indicator, the risk balance,
the performance (for example, a degree of the performance),
and/or the at least one limiting parameter can relate here to
the (at least potentially possible, for example planned)
operation of the vehicle system in the first operating mode
(for example, in a subsequently deactivated or acquired
second operating mode). The at least one limiting parameter
can be used in the same vehicle and/or in a further vehicle
(for example, for limiting a parameter or a performance
feature in the respective vehicle).

The feedback data can advantageously be items of feed-
back information of a user on an action and/or executed
functionality of the vehicle system or information which
enables an inference about items of feedback information of
a user on an action and/or executed functionality of the
vehicle system. For example, the feedback data can also at
least implicitly comprise further data, for example, data
relating to the vehicle, the user, a context, a boundary
condition during the operation of the vehicle.

Preferably, the one or more items of feedback information
characterize one or more qualitatively and/or quantitatively
differentiated degrees of the respective feedback. In particu-
lar, the feedback information can relate to a—in particular
short or very short—portion of the action and/or executed
functionality and/or driving situation.

The one or more parameters of the feedback data or the
feedback information of one or more (first) persons can
characterize an absolute degree of the feedback and/or a
change of the degree. Alternatively or additionally, the
feedback information can relate to a parameter of the cor-
responding context or a driving situation and/or a change or
deviation from the feedback in comparison to a feedback in
the case of another action and/or executed functionality of
the vehicle system in the second operating mode and/or
driving situation.

In particular, one or more items of feedback information
can characterize emotional and/or unconscious feedback, in
particular feedback of the subconscious of the user. For
example, the feedback information can characterize a feel-
ing of the subconscious of the user, for example, in response
to one or more portions of an action of the vehicle system and/or executed functionality of the vehicle system in the
second operating mode (in particular in a specific driving
situation).

Alternatively or additionally, the feedback information
can characterize feedback on the basis of expediently
selected physical parameters, in particular parameters char-
acterizing a tension and/or relaxation of specific muscles,
neural impulses, feedback of the nervous system or the brain
activity of the user or one or more corresponding patterns
(for example, with respect to a micro-expression, to lip
movements and/or eye movements of the respective person).

In a further advantageous embodiment of the invention, it
can be provided that the degree of the effectiveness of the
interventions and/or the degree of the effectiveness of an
operation or functionality decoupled from the vehicle guid-
ance is changeable as a function of one or more of the
following parameters (in particular a combination of at least
two of the parameters):

operating parameter of the vehicle, in particular vehicle
   velocity,
situation parameter characterizing a situation in the envi-
   ronment of the vehicle,
driver status, in particular attentiveness status of the
   driver,
viewing direction of the driver, and/or
parameter characterizing the risk for the driver or other
   road users.

For example, it is possible to distinguish between second
operating parameters, second situations, and/or second road-
way sections, in which the vehicle system is at least partially
decoupled from a control of the vehicle (and the correspond-
ing data are generated so to speak in "idle"), on the one hand,
and first operating parameters, first situations, and/or first
roadway sections, in which the system of the vehicle is at
least partially operated in a customer-effective manner, in
particular at least partially executes a control of the vehicle,
on the other hand.

In a further advantageous embodiment of the invention, it
can be provided that the degree of the effectiveness of the
interventions and/or the degree of the effectiveness of an
operation decoupled from the vehicle guidance is change-
able as a function of a parameter or a pattern of a driving
situation and/or roadway arrangement, and/or the operating
data of the vehicle and/or the feedback data of the user of the
vehicle are ascertained with respect to a pattern of a driving
situation and/or roadway arrangement.

The driving situation and/or roadway arrangement can be
ascertained and/or predicted here in driving operation of the
vehicle. Preferably, a parameter or a pattern of a (current
and/or upcoming) driving situation and/or the roadway
arrangement can be ascertained. A parameter or a pattern of
the roadway arrangement can be ascertained, for example,
by way of a vehicle sensor and/or a digital map.

The ascertainment can in particular also comprise or be a
prediction. Depending on the parameter or pattern of the
driving situation, the degree of the effectiveness of the
interventions and/or the degree of the effectiveness of an
operation decoupled from the vehicle guidance, in particular
a step or intermediate step of the degrees can be determined
or adapted.

Alternatively, preferably additionally, the operating data
of the vehicle and/or the feedback data of the user of the
vehicle are ascertained with respect to a parameter or a
pattern of a driving situation. It can be taken into consider-
ation here (for example, in a later use of the operating data
of the vehicle and/or the feedback data of the user of the vehicle) in conjunction with which parameters or patterns of the driving situation these have occurred.

The term "driving situation" can be understood in the scope of the present document, for example, as a specific situation—characterized by an arrangement, action, or interaction of road users or by specific driving parameters of road users.

In particular, the meaning of the term "situation" or "driving situation" differs from a common colloquially used meaning of the term "traffic situation", which corresponds more to summarizing, general categories such as "free traffic", "dense traffic", "slowly moving traffic", "congestion", "congestion end", etc.

In particular, a driving situation is (rather) characterized by a specific pattern (also to be understood as a data pattern), for example, a pattern characterizing an arrangement and/or velocity of the objects and/or a pattern of the parameters of the driving situation.

The driving situation can preferably be characterized by a spatial and/or chronological pattern of the arrangement of road users and/or the so-called free spaces in the surroundings of the vehicle. For example, the at least one predetermined condition can also relate to such features or corresponding parameters of the driving situation and/or roadway arrangement. For example, a prediction and/or pattern recognition can be executed. The degree of the effectiveness of the interventions and/or the degree of the effectiveness of an operation decoupled from the vehicle guidance can be determined depending on the result of the prediction and/or pattern recognition.

Preferably, the at least one driving situation can be characterized by one or more features listed hereinafter:

a (specific) spatial distribution of the road users and/or the movement parameters of the road users, in particular an arrangement pattern of the road users in the environment of the (real) vehicle, a (specific) spatial distribution of immovable objects in the environment of the vehicle, a relative position and/or movement parameters of specific types of lane markings, traffic signs, traffic signals (not necessarily of specific traffic signals, etc.), information about the right of way of the vehicle, in particular in relation to specific road users and/or road users which come or can come actually or at least potentially from specific directions, for example, a crossing street from the right or from the left, information on an action, for example, exceeding a limiting value, of a road user in the environment of the vehicle, for example, honking, flashing lights, tailgating, overtaking the vehicle, an overtaking attempt, or the like.

Furthermore, the driving situation can be characterized by one or more parameters in conjunction with relevant traffic rules, traffic signs, rights-of-way, traffic signals, and/or traffic signal phases. The prediction and/or pattern recognition can take place with respect to an arbitrary or expediently selected selection of the mentioned features.

The at least one driving situation can preferably be a driving situation exceeding specific limiting values or a driving situation which is characterized by parameters exceeding specific limiting values. For example, the at least one driving situation can be a driving situation having an undesired or hazardous approach to an object or another road user, an acceleration value exceeding a limiting value, an undesired arrangement in relation to further road users, etc. The driving situation can be a special situation (for example, occurring comparatively rarely) or a hazardous driving situation, for example, a driving situation for which an elevated risk is ascertained or assumed. Such driving situations can be recognized, in particular predicted, by way of correspondingly defined trigger conditions (also parameters or criteria of the trigger conditions). Data portions can thereupon be ascertained for generating a virtual environment of a vehicle, in particular a virtual environment having a specific parameter or a virtual environment of a specific type or a virtual environment which corresponds to a specific pattern made up of real vehicles.

For example, the at least one predetermined condition relates to the recognition of a driving situation upon the presence of a roadway arrangement (for example, arrangement, angle, radius, inclination, etc. of roads, lanes, onramps, off-ramps, roundabout) and/or traffic rules (for example, traffic signs, traffic signals, traffic signal phases, indicators, traffic information)—corresponding to specific parameters (for example parameter value ranges) and/or corresponding to specific patterns (for example sufficiently similar or dissimilar to one or more specific patterns).

Alternatively or additionally, the at least one predetermined condition can also be dependent on geo-positions or an environment or roadway sections delimited by specific geo-positions, which correspond to one or more specific features, parameters, and/or patterns (for example, urban environment, country road, expressway, etc., for example, in a specific country or province, a region of a specific type).

For example, it can be recognized (according to the predetermined condition) that a specific roadway arrangement or a roadway arrangement corresponding to a specific pattern, for example, an overtaking procedure in an S-curve, level crossing, a specific arrangement of real objects in a roundabout and/or with specific traffic signal switches is present.

On the one hand, the risk can be reduced here that an undesired consequence occurs, in particular if a chassis intervention, for example, in conjunction with a driving situation, is adequately managed by the vehicle functionality. Preferably, data, in particular the corresponding operating data of the vehicle and/or the feedback data of the user of the vehicle, can be obtained at the same time.

Such data can be used in particular to correct a specific disadvantage of the vehicle system (for example, an insufficient assistance of the at least one driving situation). For example, an introduction (for example, market introduction) of a functionality for at least partially automated driving or parking can take place in multiple steps.

In particular, a degree of the effectiveness of the interventions and/or the degree of the effectiveness of an operation decoupled from the vehicle guidance, in particular a step or intermediate step, can be dynamically determined or adapted for different (each occurring or predicted) parameters or patterns of the driving situations and/or roadway arrangements (for example, depending on the one or more parameters or patterns or further information).

In a further advantageous embodiment of the invention, a distinction can be made between first interventions, in particular first maneuvers, which are sufficiently safely executable using the system of the vehicle, on the one hand, and second interventions, in particular second maneuvers, which are not sufficiently safely executable using the system of the vehicle. This distinction can also be performed based on an activation (in particular current, related to time intervals, software version, and/or driving routes) of the system of the vehicle.

In a further advantageous embodiment of the invention, it can be provided that the feedback data comprise feedback information of the driver on a proposed action which is not executed in an automated manner or is only partially executed in an automated manner and/or executed functionality of the vehicle system in the second operating mode. The at least one action can be, for example, an action within at least partially automated driving or parking.

Findings can be obtained on the basis of the feedback data or the feedback information which are necessary for the development, the securing, the training of a vehicle system, and/or the proof of the positive risk balance, and for which it would be necessary to drive billions of kilometers with the experimental fleet without such an embodiment of the invention.

For example, the feedback data or the feedback information can comprise a subsequent request for and/or recording of the opinion(s) of the user of the vehicle in relation to conscious feedback:

as to whether the action would have been correct from the viewpoint of the user of the vehicle, whether the action would be sufficiently harmless or excessively dangerous, whether the user of the vehicle would also have acted the same way or differently, whether the user of the vehicle would feel good about a correspondingly executed automated action, and/or which corrections the user of the vehicle would have made in the proposed action and/or executed functionality of the vehicle system in the second operating mode.

The at least one action can be, for example, a single action comprising at least one element of driving or parking.

The user of the vehicle is to be understood in particular as an end-user (customer). The advantage results here (in particular in the collection of the feedback information of vehicles having multiple users) that the feedback information enables an inference about the subjective perception of the user (therefore possibly also the customers of the automobile producer or the operator of the vehicles). Preferably, it is possible to ascertain on the basis of multiple items of feedback information (for example statistical) information which characterizes or represents an (objectified) perception of the user with respect to the vehicle system (for example, with respect to a specific embodiment of the vehicle system).

For example, in particular statistically representative items of information relating to the vehicle system and one or more users, in particular one or more groups (for example, also user groups, customer groups, customer segments) can be ascertained by processing, in particular comprising aggregation and/or analysis of a large number of the items of feedback information. The information can be used, for example, for the further design, parameterization, and marketing of the vehicle system or the vehicles.

For example, depending on the information, specific measures can be determined for the development and/or the operation of the vehicle system in the first operating mode, and/or the operation of a vehicle fleet comprising vehicles having the vehicle system.

The user can be the driver, user, or passenger of a vehicle which can be driven or parked in an at least partially automated manner.

Therefore, on the one hand, a user of the vehicle, for example, a vehicle owner or customer who has purchased a vehicle, which cannot yet drive in an automated manner, can already gain his experiences with possibly automated driving functions to the greatest possible degree beforehand, and, on the other hand, the automobile producer would receive extremely valuable feedback information and/or other information on the vehicle system (also possibly to be understood as a development stage of the vehicle system).

In a further advantageous embodiment of the system, it is provided that the vehicle system is to be designed to acquire (further) data portions, wherein the data portions comprise at least data which are based on at least one of the following items of information:

items of information relating to an environment and/or environmental situation of the vehicle, information relating to control data of the vehicle system decoupled from the vehicle control, and/or in particular in particular also items of information acquired concomitantly or subsequently relating to the feedback data, in particular feedback data characterizing items of feedback information about the feedback of the driver on a proposed action, which is not executed in an automated manner or is only executed in a partially automated manner, and/or an executed functionality of the vehicle system.

To be able to achieve the greatest possible utility, the vehicle system is advantageously furthermore designed to transmit the acquired data portions to a computing unit remote from the vehicle system, in particular from the vehicle.

Furthermore, such a vehicle system can also be carried along in customer vehicles and can be active so to speak "in idle" in the second operating mode, without disturbing the customer. The obtained data of the new environment (this is also to be understood as a new situation artificially constructed, designed, or synthesized as described here) can be used, for example, to prove a positive risk balance and/or to train neural networks.

The resulting data (representing the new environment) can be processed, in particular reprocessed, for example, in a stationary environment (for example, within a simulation). For example, a vehicle system operated in a stationary manner (having the same software and/or alternative software) can be operated using the data of the new environment. Alternatively, computing units which emulate (simplified: simulate) the system of the vehicle can be operated using the data of the new environment.

For example, the data of the new environments (in particular of specific situations) can be ascertained by way of appropriately configured game consoles (or computing units having a comparable architecture). Alternatively or additionally, the game consoles can be used for further processing of the data, for example, to ascertain a risk balance and/or an identification of situations which can be well managed or cannot be managed using specific algorithms. Furthermore, game consoles (or computing units having a comparable architecture) can also be used for emulation of a vehicle system or the development stage. An extremely large number of the emulations can be played through so to speak virtually (so to speak in fast-forward) on the game consoles.

The feedback data of a vehicle system (for example operated in a stationary manner) can be obtained—in particular ascertained—here from the data of the new (artificially generated) environment, in particular from specific (artificially generated) situations. The term "system of the vehicle" or "vehicle system" can be understood both as a system which is installed in a vehicle and also a correspondingly designed system in a vehicle-external environment, in particular in a development environment, simulator, or the like. These feedback data of one or more vehicle-external vehicle systems can (at least approximately) correspond to the feedback data of a real vehicle or a vehicle system in a real vehicle in a real situation. A combination of items of environmental information (for example objects), which originate from two different situations, can also be made in one situation in the second operating mode.

Feedback data are (also) to be understood in the scope of this document as any operating data of the vehicle system which arise due to a change of the data of a (real) environment or are influenced by such data.

An array of possible applications and advantages results by way of embodiments of the invention.

On the one hand, data thus ascertained from a real operation, in particular in a vehicle fleet, customer vehicles, or the so-called customer fleet, can be used for substantially risk-free (or connected to no or minor negative effects for the user) development, testing, or securing of vehicles, in particular of the same or further (corresponding) functionalities. These data can characterize (possibly represent or reflect) information from realistic situations here. These permit an inference upon their use as to how the at least one functionality for automated driving and/or parking would perform without the second operating mode or with a deactivated operating mode. This can take place without risking a negative effect of the user here.

With a correspondingly large amount of obtained data, it is possible to presume statistically representative data, due to which a further shortening of the development cycles can be enabled. For example, a degree of performance and/or a degree of risk relating to a later operation of the device or functionality can be predicted (particularly precisely or reliably).

Furthermore, the vehicle system can be used to obtain real customer feedback. At the same time, using the data on the basis of the collected operating data and/or feedback data, possible concerns in the public against (highly) automated vehicles can be dissipated. Furthermore, users (also customers) can already be introduced early to vehicle systems for at least partially automated driving or parking, which already comparatively early enhance a user value of the respective vehicles.

Exemplary embodiments of the invention are explained in more detail hereinafter without restriction of the generality on the basis of the schematic drawings. These are freely combinable with the above-described features.

DETAILED DESCRIPTION OF THE DRAWINGS

Figure 1:
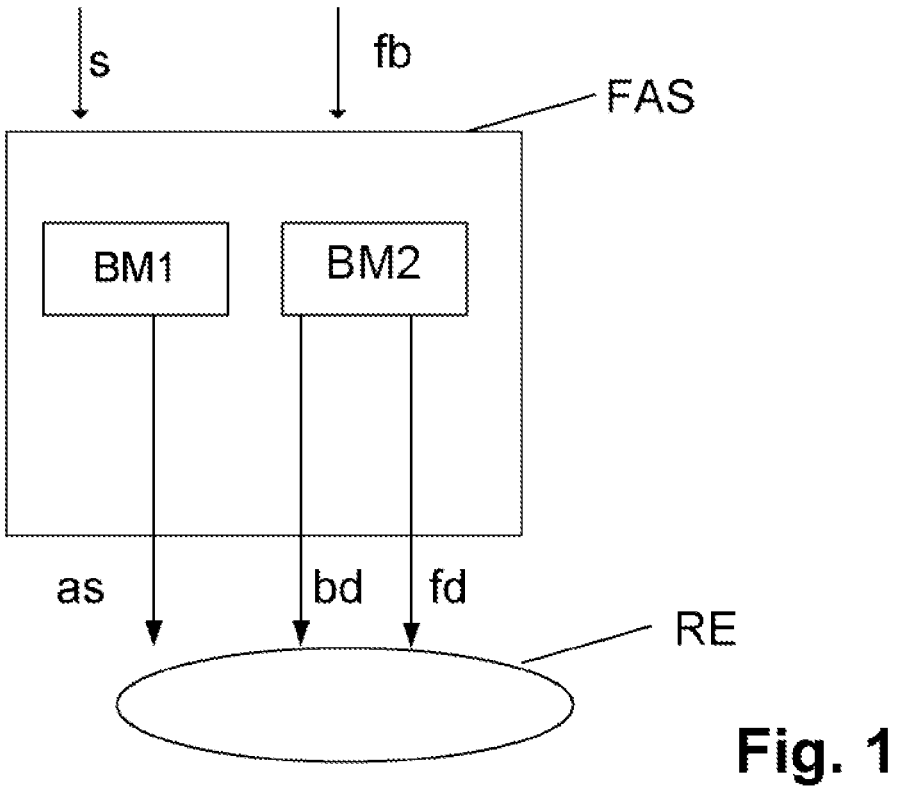
FIG. 1 shows an example of an embodiment of a vehicle system according to the invention.

FIG. 1 shows a vehicle system FAS for use in a vehicle (not shown here) for at least partially automated driving. The vehicle system FAS comprises as a core element a control unit SE, which is configured to be operated in 2 operating types BM1 and BM2. The control unit SE receives, as input signals, signals acquired by way of suitable sensors and/or sensor signals s derived from the acquired signals and a signal fb, which supplies information about the driving operation of the vehicle.

The first operating mode BM1 is configured to execute a functionality of the vehicle system in driving operation based on acquired sensor signals s and fb and, based on the result of the executed functionality, to operate the vehicle in an at least partially operated manner by interventions in the vehicle guidance. The output signals as can be designed, for example, to initiate an intervention in the vehicle longitudinal guidance, the vehicle lateral guidance, the drive and/or break unit, and/or an activation of a notification signal to the driver.

The second operating mode BM2 is configured, upon execution of the second operating mode, to execute basically the same functionality as in the operating mode, but with a changed degree of effectiveness of the intervention in the vehicle guidance and/or with a changed degree of the effectiveness of an operation decoupled from the vehicle guidance. In other words, in the second operating mode BM2, which can be activated when the first operating mode BM1 is not active or when, with active first operating mode BM1, an intervention in the vehicle guidance initiated by the first operating mode BM1 is not changed by the operation of the second operating mode BM2, a specific functionality is only executed "virtually" and/or visually (i.e., the output signal initiated by the functionality does not result in a direct intervention in the vehicle guidance, but only (if at all) in the output of an optical display. The operating data bd of the vehicle acquired upon the execution of the second operating mode BM2 and/or feedback data fd of the user of the vehicle acquired following the execution of the second operating mode are made available by the control unit SE for further use (in the same vehicle system FAS, in other vehicle systems of the vehicle, or in systems outside the vehicle). To enable a use of the data bd and/or fd outside the vehicle, the data bd and fd are transmitted to a vehicle-external computing unit RE (for example, a backend).

Further possible embodiments of the system according to the invention will be explained on the basis of the following description of FIG. 2.

Figure 2:
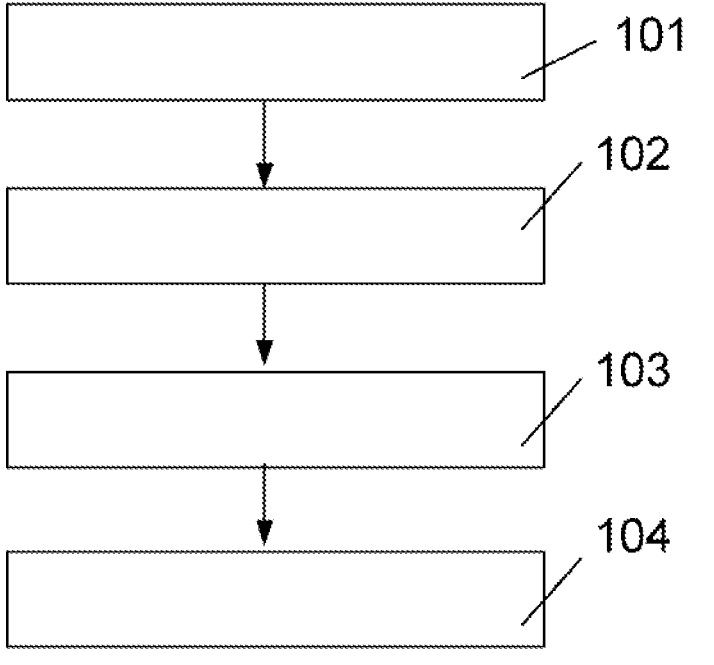
FIG. 2 shows an example of an embodiment of a method according to the invention on the basis of a flow chart.

FIG. 2 shows a flow chart for a method 100 for operating a vehicle system designed for use in a vehicle for at least partially automated driving. This method 100 can comprise one or more steps or features described hereinafter in any combination or sequence:

Step 101: Executing a functionality of the vehicle system in driving operation based on acquired sensor signals and at least partially automated operation of the vehicle by interventions in the vehicle guidance based on the result of the executed functionality.

Step 102: Changing a degree of effectiveness of the interventions in the driving operation and/or a degree of effectiveness of an operation (in a second operating mode) decoupled from the vehicle guidance, wherein the degree of the effectiveness of the interventions and/or the degree of the effectiveness of an operation decoupled from the vehicle guidance can be changeable in multiple steps, in particular at least partially and/or nearly continuously. In particular, the degree of the effectiveness of the interventions and/or the degree of the effectiveness of an operation decoupled from the vehicle guidance can be changeable in at least two steps, wherein the at least two steps are assigned to one of the following categories:

operating the vehicle system without a directly perceptible effect for the driver or with a hardly perceptible effect for the driver, operating the vehicle system with an output of driver information, in particular with an output of driver information without an intervention in the vehicle guidance, and operating the vehicle system with a visualization of an action which would result due to an intervention of the vehicle system in the vehicle guidance.

Furthermore, the degree of the effectiveness of the interventions and/or the degree of the effectiveness of an operation decoupled from the vehicle guidance can be changeable as a function of one or more of the following parameters:

operating parameter of the vehicle, in particular vehicle velocity, situation parameter characterizing a situation in the environment of the vehicle, driver status, in particular attentiveness status of the driver, viewing direction of the driver, and parameter characterizing the risk for the driver or other road users.

Step 103: Executing a functionality of the vehicle system with changed degree of the effectiveness of an intervention in the vehicle guidance and/or changed degree of the effectiveness of an operation decoupled from the vehicle guidance (in a second operating mode).

Step 104: Acquiring operating data of the vehicle and/or feedback data of the user of the vehicle upon the execution of a functionality of the vehicle system with changed degree of the effectiveness of an intervention in the vehicle guidance and/or changed degree of the effectiveness of an operation decoupled from the vehicle guidance and making the data available for a further use. For example, the acquired operating data of the vehicle and/or the acquired feedback data of the user of the vehicle can be made available for at least one of the following uses:

to test and/or to secure a development stage of the vehicle system, to ascertain at least one performance indicator of the vehicle system, to prove a positive risk balance of the vehicle system, in particular for inferences about an expected performance of the vehicle system on environmental objects of the vehicle, to operate a vehicle system for at least partially automated driving of a further vehicle, to determine one or more—in particular dependent on further information—limiting parameters for operating the vehicle system, to train a neural network, in particular a DNN (=deep neural network), to activate and/or block functionalities (also maximum performance) of a vehicle, in particular of vehicles having vehicle systems for at least partially automated driving, to activate and/or block defined feedback functionalities of the vehicle system, in particular for similar starting situations, and/or to change data of a digital map and/or data for interpretation of a digital map, in particular to activate and/or to block specific roadway sections for the execution of specific performance functionalities and/or feedback functionalities in specific situations.

Training of a neural network can be executed in the method 100. The term "neural network" is to be understood in the scope of the present document in particular as a DNN (deep neural network). Alternatively or additionally, the neural network is to be understood as an arbitrary form or implementation of an artificial intelligence (AI).

Alternatively or additionally, the method 100 can be executed multiple times, in particular iteratively. Training and/or updating (for example update) of the features, the weight data, a bias term, etc. of the neural network can be executed here, for example (possibly also in the vehicles located in customer operation). For example, the neural network can be updated at regular intervals or upon the occurrence of an insufficiently high level of performance and/or upon the presence of an improved performance.

The invention claimed is:

1. A vehicle system for use in a vehicle for at least partially automated driving or parking, the vehicle system comprising:

a first operating mode, which is configured to execute a functionality of the vehicle system in driving operation based on acquired sensor signals and to operate the vehicle in an at least partially automated manner by interventions in vehicle guidance based on a result of the executed functionality, and a second operating mode, which is configured:

to change a degree of effectiveness of the interventions in the driving operation and a degree of effectiveness of an operation decoupled from the vehicle guidance, to execute a functionality of the vehicle system with a changed degree of effectiveness of an intervention in the vehicle guidance and a changed degree of effectiveness of the operation decoupled from the vehicle guidance, and upon execution of the functionality of the vehicle system with the changed degree of effectiveness of the intervention in the vehicle guidance and the changed degree of effectiveness of the operation decoupled from the vehicle guidance, to acquire operating data of the vehicle and/or feedback data of a user of the vehicle and make the operating data of the vehicle and/or the feedback data of the user of the vehicle available for further use.

2. The vehicle system according to claim 1, wherein the degree of effectiveness of the interventions and/or the degree of effectiveness of the operation decoupled from the vehicle guidance is changeable in multiple steps.

3. The vehicle system according to claim 1, wherein the degree of effectiveness of the interventions and/or the degree of effectiveness of the operation decoupled from the vehicle guidance is changeable at least partially continuously and/or nearly continuously.

4. The vehicle system according to claim 1, wherein:

the degree of effectiveness of the interventions and/or the degree of effectiveness of the operation decoupled from the vehicle guidance is changeable in at least two steps, and the at least two steps are assigned to one of the following categories:

operating the vehicle system without a directly perceptible effect for a driver or with a hardly perceptible effect for the driver, operating the vehicle system with an output of driver information, or operating the vehicle system with a visualization of an action which would result due to an intervention of the vehicle system in the vehicle guidance.

5. The vehicle system according to claim 1, wherein:

the degree of effectiveness of the interventions and/or the degree of effectiveness of the operation decoupled from the vehicle guidance is changeable in at least two steps, and the at least two steps are assigned to one of the following categories:

operating the vehicle system without a directly perceptible effect for a driver or with a hardly perceptible effect for the driver, operating the vehicle system with an output of driver information and without an intervention in the vehicle guidance, or operating the vehicle system with a visualization of an action which would result due to an intervention of the vehicle system in the vehicle guidance.

6. The vehicle system according to claim 1, wherein the operating data of the vehicle and/or the feedback data of the user of the vehicle are made available for at least one of the following uses:

to test and/or to secure a development stage of the vehicle system, to ascertain at least one performance indicator of the vehicle system, to prove a positive risk balance of the vehicle system, to operate a further vehicle system for at least partially automated driving of a further vehicle, to determine one or more limiting parameters for operating the vehicle system, to train a neural network, to activate and/or block functionalities or limiting parameters of functionalities of the further vehicle, to activate and/or block defined feedback functionalities of the vehicle system, and/or to change data of a digital map and/or data for interpretation of the digital map.

7. The vehicle system according to claim 6, wherein the risk balance is for inferences about an expected performance of the vehicle system on environmental objects of the vehicle.

8. The vehicle system according to claim 6, wherein the one or more limiting parameters depend on further information.

9. The vehicle system according to claim 6, wherein the neutral network is a deep neural network.

10. The vehicle system according to claim 6, wherein to change the data of the digital map and/or the data for interpretation of the digital map is to activate and/or to block specific roadway sections for execution of specific performance functionalities and/or feedback functionalities in specific situations.

11. The vehicle system according to claim 1, wherein the feedback data comprise items of feedback information of the user on an action and/or the executed functionality of the vehicle system in the second operating mode.

12. The vehicle system according to claim 1, wherein the degree of effectiveness of the interventions and/or the degree of effectiveness of the operation decoupled from the vehicle guidance is changeable as a function of one or more of the following parameters:

an operating parameter of the vehicle, a situation parameter characterizing a situation in an environment of the vehicle, an attentiveness status of a driver, a viewing direction of the driver, and/or a parameter characterizing a risk for the driver or other road users.

13. The vehicle system according to claim 12, wherein the operating parameter of the vehicle is vehicle velocity.

14. The vehicle system according to claim 1, wherein the degree of effectiveness of the interventions and/or the degree of effectiveness of the operation decoupled from the vehicle guidance is changeable as a function of a parameter or a pattern of a driving situation and/or a roadway arrangement, and/or the operating data of the vehicle and/or the feedback data of the user of the vehicle are ascertained with respect to the pattern of the driving situation and/or the roadway arrangement.

15. The vehicle system according to claim 1, wherein the feedback data comprise items of feedback information of a driver to a proposed action, which is not executed in an automated manner or is only partially executed in the automated manner, and/or the executed functionality of the vehicle system in the second operating mode.

16. The vehicle system according to claim 1, wherein:

the vehicle system is configured to acquire data portions, and the data portions comprise data which are based on at least one of:

items of information relating to an environment and/or an environmental situation of the vehicle, items of information relating to control data of the vehicle system decoupled from the vehicle control, or information relating to the feedback data which is not executed in an automated manner or is only partially executed in the automated manner, and/or the executed functionality of the vehicle system in the second operating mode.

17. The vehicle system according to claim 16, wherein the feedback data characterize items of feedback information about feedback of a driver to a proposed action.

18. The vehicle system according to claim 16, wherein the vehicle system is further configured to transmit the acquired data portions to a computing unit remote from the vehicle system.

19. The vehicle system according to claim 16, wherein the vehicle system is further configured to transmit the acquired data portions to a computing unit remote from the vehicle.

20. A method for operating a vehicle system configured for use in a vehicle for at least partially automated driving, the method comprising:

in a first operating mode, executing a functionality of the vehicle system in driving operation based on acquired sensor signals and operating the vehicle in an at least partially automated manner by interventions in vehicle guidance based on a result of the executed functionality, and in a second operating mode:

changing a degree of effectiveness of the interventions in driving operation and a degree of effectiveness of an operation decoupled from the vehicle guidance, executing a functionality of the vehicle system with a changed degree of effectiveness of an intervention in the vehicle guidance and a changed degree of effectiveness of the operation decoupled from the vehicle guidance, and upon execution of the functionality of the vehicle system with the changed degree of effectiveness of the intervention in the vehicle guidance and the changed degree of effectiveness of the operation decoupled from the vehicle guidance, acquiring operating data of the vehicle and/or feedback data of a user of the vehicle and making the operating data of the vehicle and/or the feedback data of the user of the vehicle available for further use.

\* \* \* \* \*